(12) United States Patent
Choi

(10) Patent No.: US 6,230,776 B1
(45) Date of Patent: *May 15, 2001

(54) APPARATUS FOR FORMING FIBROUS FILTER MEDIA

(75) Inventor: Kyung-Ju Choi, County of Jefferson, KY (US)

(73) Assignee: AAF International, Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/697,543

(22) Filed: Oct. 26, 2000

Related U.S. Application Data

(62) Division of application No. 09/176,665, filed on Oct. 21, 1998, now Pat. No. 6,159,318.

(51) Int. Cl.[7] .................. B32B 31/30; B01D 35/00
(52) U.S. Cl. .................. 156/441; 156/474; 156/510; 425/83.1; 425/369
(58) Field of Search .................. 156/62.2, 62.4, 156/167, 180, 181, 205, 285, 473, 474, 441, 510; 264/101, 109, 113, 120, 121, 517, 518; 425/83.1, 369

(56) References Cited

U.S. PATENT DOCUMENTS

| Re. 31,599 | * | 6/1984 | Rasen et al. | 156/167 |
|---|---|---|---|---|
| 3,849,241 | | 11/1974 | Butin et al. | 161/169 |
| 3,878,014 | | 4/1975 | Melead | 156/167 |
| 4,042,740 | | 8/1977 | Krueger | 428/138 |
| 4,656,081 | | 4/1987 | Ando et al. | 428/233 |
| 4,936,934 | | 6/1990 | Buehning | 156/167 |
| 5,643,653 | | 7/1997 | Griesbach, III et al. | 428/120 |
| 5,725,812 | | 3/1998 | Choi | 264/6 |

* cited by examiner

Primary Examiner—Sam Chuan Yao
(74) Attorney, Agent, or Firm—Polster, Lieder, Woodruff & Lucchesi, L.C.

(57) ABSTRACT

A method, apparatus and filter unit product wherein filter media fibers are fed from a media supply source to a mat forming interchangeable and movable contoured surface to contour shape a filter media mat into a preselected form for subsequent movement to a transfer zone for further contour shaping and processing into filter unit products with preselected frame arrangements.

8 Claims, 6 Drawing Sheets

APPARATUS FOR FORMING FIBROUS FILTER MEDIA

This application is a division of Ser. No. 09/176,665, filed on Oct. 21, 1998 now U.S. Pat. No. 6,159,318.

BACKGROUND OF THE INVENTION

The present invention relates to a unique and novel method and apparatus for producing filter media and more particularly to a unique method and apparatus for forming filter media into one or more of several preselected configurations and producing novel unit filter structure therefrom.

It has been long known in the filter art to collect filter media issuing from a filter media forming apparatus unto a drum or endless belt in a continuous, elongated sheet and to then process the elongated sheet into a preselected form for subsequent assembly into unit disposable or permanent flow-through frames. In this regard, attention is directed to U.S. Pat. No. 5,725,812, issued to Kyung-Ju Choi on Mar. 10, 1998 and to U.S. patent application Ser. No. 08/677631, filed by Kyung-Ju Choi on Jul. 8, 1996, both of which teach methods of continuously forming fibrous filter media and collecting the endless fibers on a collector drum, including novel air distribution and unique air pulsing arrangements, respectively. In this regard, it is to be understood that the present invention is not to be considered as limited to the novel, non-related fibrous forming method and collection arrangements disclosed on the aforementioned patent and patent application but that other fibrous forming methods can be utilized herewith, including well known chopped fiber forming arrangements which are not disclosed herein. In this regard, attention is further directed to U.S. patent application Ser. No. 09/038,744 filed by Kyung-Yu Choi on Mar. 11, 1998, which teaches an endless belt pleating arrangement and to U.S. Pat. Nos. 3,849,241, issued to R. R. Butin et al on Nov. 19, 1974; 3,878,014, issued to J. J. Melead on Apr. 15, 1975; 4,042,740, issued to D. L. Krueger on Aug. 16, 1977; 4,656,081, issued to K. Ando et al on Apr. 7, 1987 and 4,936,934, issued to P. G. Buehning on Jun. 26, 1990. These five patents also teach various arrangements for continuously forming fibrous filter media and collecting the fibers on a collector drum, including respectively: controlling fiber material viscosity levels; varying pressures on the collecting drum; collecting fibers into a network of high density and pillowed low density regions; collecting fibers at an angle to the tangential line of the collecting surface; and collecting fibers on a perforated collector drum at equal air flow rates. None of these patents, either alone or in combination, however teaches or suggests the novel method, apparatus and product disclosed herein wherein fibers are collected on an interchangeable, preselectively contoured forming surface in a straight forward and economical arrangement requiring a minimum of parts and a minimum of operating steps heretofore unknown in the act. In addition attention is directed to U.S. Pat. No. 5,643,653, issued to H. L. Griesbach III, et al on Jul. 1997, which broadly teaches collecting randomly emitted fibers unto a moveable forming surface.

In accordance with the present invention, a unique fiber collector surface arrangement is provided which allows for ready interchangeability of the contour surface to be utilized and which, at the same time allows for ready velocity and temperature control. In addition, the present invention provides for a novel transferring, binder and temperature treating arrangement of the uniquely contour formed fibrous material and further provides a unique unit framing arrangement and unit product for the formed and treated material.

Various other features of the present invention will become obvious to one skilled in the art upon reading the disclosure set forth herein.

BRIEF SUMMARY OF THE PRESENT INVENTION

More particularly the present invention provides a method of forming fibrous filter media comprising: selected and fastening a preselected, interchangeable, contoured surface on a moveable collector to be disposed in a forming zone; feeding filter media fibers in at least one separate and distinct layer from a spaced media supply zone unto the preselectively contoured surface on the moveable collector in the forming zone to contour shape a filter mat to conform with the preselectively corresponding contoured surface fastened on the moveable collector; and, feeding the conformed contour shaped filter mat from the forming zone to a further filter mat treating zone. In addition the present invention provides a novel apparatus for the forming fibrous filter media comprising: a fiber media forming means having a plurality of spaced die sets, each set including a plurality of spaced apertures arranged to dispense aligned fibrous strands therefrom in layer form; a mat forming collector means having an interchangeable contoured surface positioned in relatively movable spaced relation below the forming means to successively receive each aligned layer form from each die set at the forming means to preselectively contour shape stacked mat layers successively received from the forming means; and transfer means cooperatively positioned with respect to the collector means to receive contour-shaped mats therefrom to transfer the mats to other work stations for further processing. Further, the present invention provides novel flow-through frame members for the contour shaped fibrous filter media of disposable or permanent material including disposable and permanent holding members arranged to retain the contour shaped layers of fibrous filter media in fixed and stable position in the surrounding frame.

It is to be understood that various changes can be made by one skilled in the art in one or more of the several steps of the method and in one or more of the several parts of the novel apparatus and products as disclosed herein without departing from the scope or spirit of the present invention.

BRIEF DESCRIPTION OF THE DRAWINGS

Referring to the drawings which disclose one advantageous embodiment of the present invention and the novel arrangements which can be utilized therewith.

DETAILED DESCRIPTION OF THE INVENTION

Figure 1:
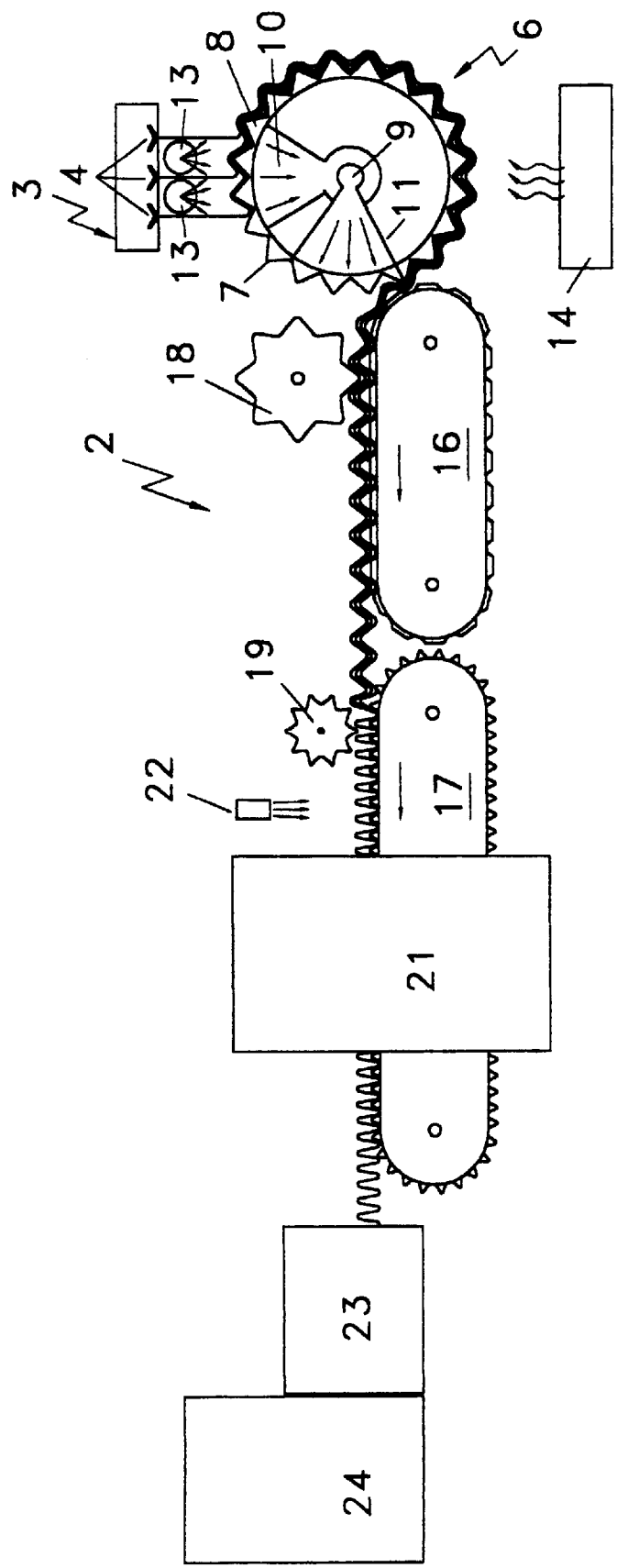
FIG. 1 is a side view of a schematic plan arrangement of the novel apparatus which can be utilized to carry out the several steps of the novel method for producing the unique product as described herein.

Referring to the schematic side plan view in FIG. 1 of the drawings, the novel apparatus 2 is schematically shown to include a fibrous filter media supply source which is here schematically shown as a heated, fiber filter media forming die head 3 having a plurality of spaced, aligned aperture rows 4 arranged to dispense rows of fibrous filter media strands therefrom in heated mat layers. It is to be understood that any one of a number of filter media supply source arrangements known in the art can be utilized for dispensing fibrous filter media mats. Advantageously, the filter media supply source can be a melt blown die assembly such as disclosed in the aforementioned U.S. Pat. No. 5,725,812 and in patent application Ser. No. 08/677,631, but other filter media supply sources can be utilized as well, even including source arrangements which dispense fibrous filter media mat in chopped mat form. In accordance with one feature of the present invention, the fibrous filter supply source, in this instance, the die head 3 can be arranged to include aligned, spaced apertures of varying aperture area sizes, so that the mat forming layers of a first mat layer are larger in cross-sectional area than the crosssectional area of layer fibers in a successive mat layer of fibers with aligned fibers in further successive mat layers being of successively diminishing cross-sectional area. In this regard, it is to be understood that any one of a number of preselected filter media mat layers can be produced with the cross-sectional areas of fibers of each successive mat layer being preselectively varied in accordance with the desired characteristics that might be sought for the final manufactured product.

Figure 2:
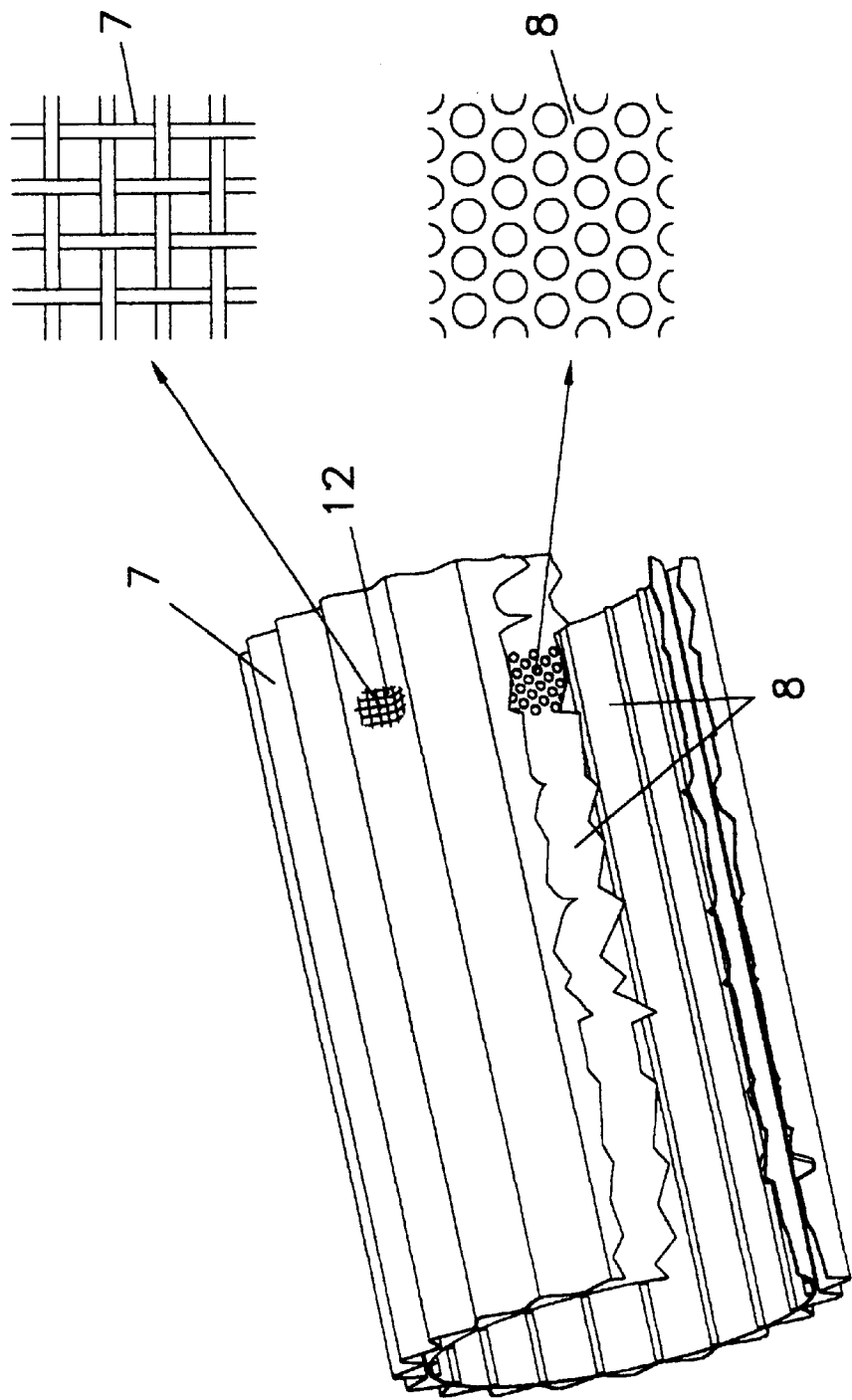
FIG. 2 is an enlarged, partial, broken away, isometric view of a portion of the novel pleat forming drum which can be utilized in the arrangement of FIG. 1.

As shown in FIG. 1, a rotatable collector drum 6 is schematically shown as preselectively spaced below the die head 3 to successively receive the aligned rows of fibers forming the fibrous mat layers from the aligned, spaced, aperture rows 4 of the die head 3 so that the superposed layers, which are received on collector drum 6, can have strands of diminishing, cross-sectional area from the top to bottom layers. Referring to FIG. 2 of the drawings, it can be seen that rotatable collector drum 6 can be so formed as to include an interchangeable outer pleated flexible porous screen peripheral surface 7 which can be preselectively formed from suitable flexible metallic or plastic wire screen to include successively spaced pleats of preselectively constant or selective variable depth. A flexible perforated back-up sheet 8 can be utilized to afford the rotatable drum structural stability. It is to be understood that drum 6 (FIG. 1) can be of a hollow nature to accommodate a fluid treating assembly 9 therein including a vacuum arm 10 and a flared broadcast arm 11 which serves to transmit a cooling fluid such as air through the interchangeable perforated back-up sheet 8 and removable corrugated wire screen 7 unto the layered mat which is received and formed in pleated shape on the peripheral surface of rotatable drum 6. It is to be understood that suitable end plates and variable speed drive motor and gearing (not shown) can be employed to rotatably drive collector drum 6 at preselected speeds to receive the fibrous filter layers from die head 3. As can be seen particularly in FIG. 2, the removable peripheral corrugated wire screen 7 and the perforated back-up sheet 8 are each provided with appropriate apertures 12 which can be aligned to receive a fastening member (not shown) to hold the drum sheets in a cylindrical mat receiving form and to allow for a ready interchange of outer peripheral wire screens 7, each corrugated with a preselected forming contour.

Referring to FIG. 1, it can be seen that appropriate binder material dispensers 13 can be positioned above interchangeable rotatable drum 6 and below die head apertures rows 4 to dispense a suitable mat binding material between and unto the formed fibrous filter mats as they initially reach the screen wire surface 7 of rotatable drum 6. A suitable heater 14, here shown as positioned in spaced relation below rotatable drum 6 serves to direct a mildly heated forming fluid unto the drum receiving peripheral surface. As a formed mat exits the drum, a fluid cooling agent from a fluid cooler broadcast arm 11 positioned within rotatable drum 6, is directed against the mat by such flared broadcast arm 11.

Cooperating with and adjacent rotating drum 6 are two aligned transfer assemblies in the form of endless belts 16 and 17. Belt 16, adjacent drum 6, is driven at a selected speed compatible with the peripheral speed of rotating drum 6 to accept the pleat formed fibrous filter material from drum 6 with the corrugated formations on both belt 16 and on a superposed rotating pleat spacer 18, which is positioned in spaced relation above the inlet end of endless belt 16, being so contoured as to maintain the pleats in substantially the same configuration as initially formed on rotatable drum 6. In this regard, it is to be noted that the adjacent endless belt 17, which is aligned with belt 16 and the superposed pleat spacer 19 positioned thereabove advantageously both have corrugated formations which are of lesser configuration than the corrugated formations on endless belt 16 and pleat spacer 18 thereabove with endless belt 17 being driven at a preselected slower speed than the speed of endless belt 16. This arrangement results in the gathering and the elevation of the pleat formed material as it is transferred from one endless belt zone or station 16 to the next endless belt zone or station 17. It is to be understood that a suitable drive motor and gear assembly (not shown) can be connected to the aligned endless belts 16 and 17 and superposed pleat spacers 18 and 19 thereabove to transfer the pleated material to a desired location.

Prior to temperature soaking of the pleated material in oven 21 through which endless belt 17 can be arranged to pass, and if desired, binder material dispenser 22 can be employed above endless belt 17 to add additional binding material to the pleat formed fibrous filter material it desired.

Once the pleat formed fibrous filter material has been temperature soaked for a preselected time period and at a preselected temperature, it can then be severed into separate filter units by a suitable mechanical or other severing device 23 and then assembled with appropriate frames at station 24, severing device 23 and framing station 24 being shown only in block form on the schematic illustration of FIG. 1.

It is to be understood that in accordance with one embodiment of the present invention, the above described binder dispensers 13 and 22, flared broadcast arm 11 transmitting a cooling fluid, heater 14, and temperature soaking oven 21, can all, or one or more of the same, be eliminated, it only being necessary that the fibers fed from the media supply zone to the movable collector be sufficiently heated either in the spaced media supply zone or at least before reaching the collector in the forming zone to allow such fibers to reach a preselected melt stage to enhance bonding.

Figure 4:
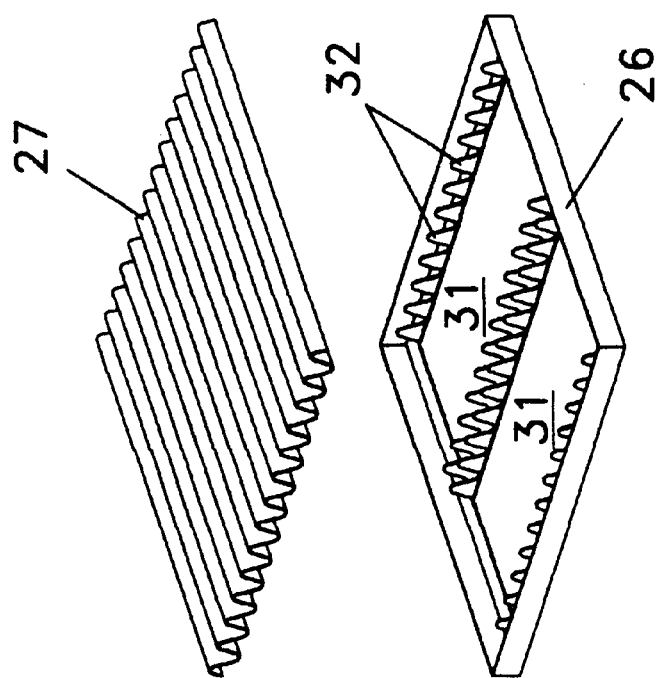
FIG. 4 is an isometric, exploded view of a novel unit filter utilizing the filter media formed in accordance with the arrangement of FIGS. 1 and 2 and a unique flow-through frame like that of FIGS. 3 and 4.
Figure 3:
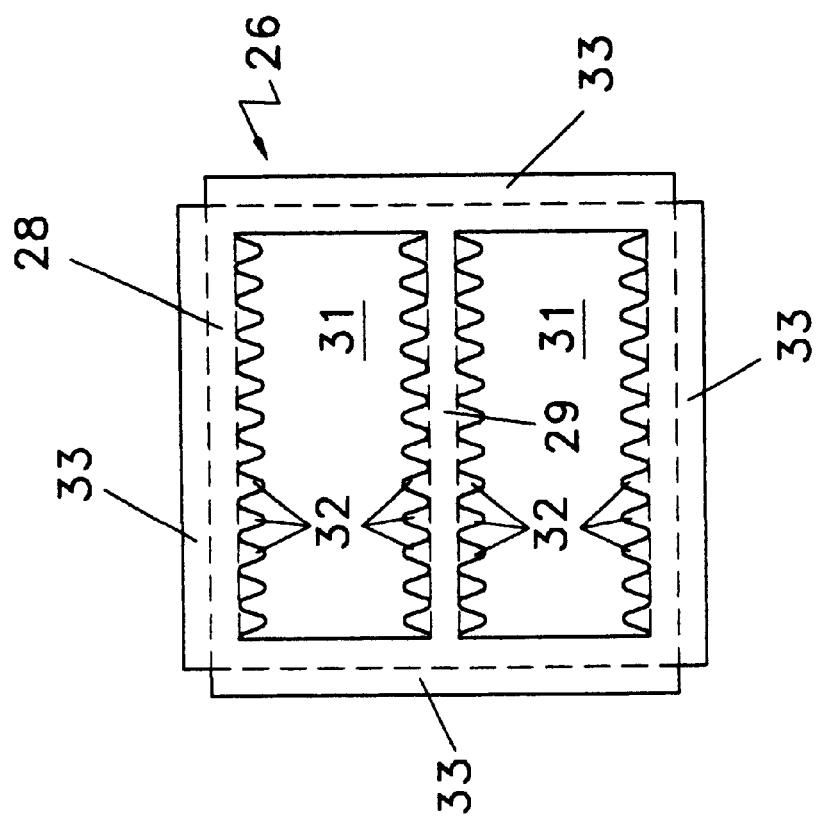
FIG. 3 is a top plan view of a novel unique flow-through disposable frame blank which can be employed with pleated fiber filter media formed in accordance with the present invention.

As can be seen in FIGS. 3 and 4 of the drawings, one novel disposable frame blank 26 (FIG. 3) is disclosed. Blank 26 can be formed by stamping a suitably selected cardboard or plastic material and can be appropriately sized and shaped in accordance with the unit filter media 27 (FIG. 4) formed, treated, and severed in accordance with the aforedescribed novel arrangement described herein and disclosed in FIGS. 1 and 2 of the drawings. The main body 28 of blank 26 is here shown as being rectangular in shape to include intermediate rib member 29 and flow-through passages 31. A plurality of tabs 32 extending from body 28 and rib 29 serve as pleat spacers when the blank is set-up as a frame by folding both the tabs 32 along with sides 33 also extending from the outer periphery of body 28 at right angles. Referring to FIG. 4 of the drawings, a set-up unit frame 26 is shown in position to receive the novel filter unit 27 with the several pleats having the side walls thereof nesting along the side flanks of tabs 32 on one face of unit filter media 27. It is to be understood that appropriate mechanical fasteners or fastening glue can be provided between engaging parts to aid in the stability of the assembled unit filter frame.

Figure 5:
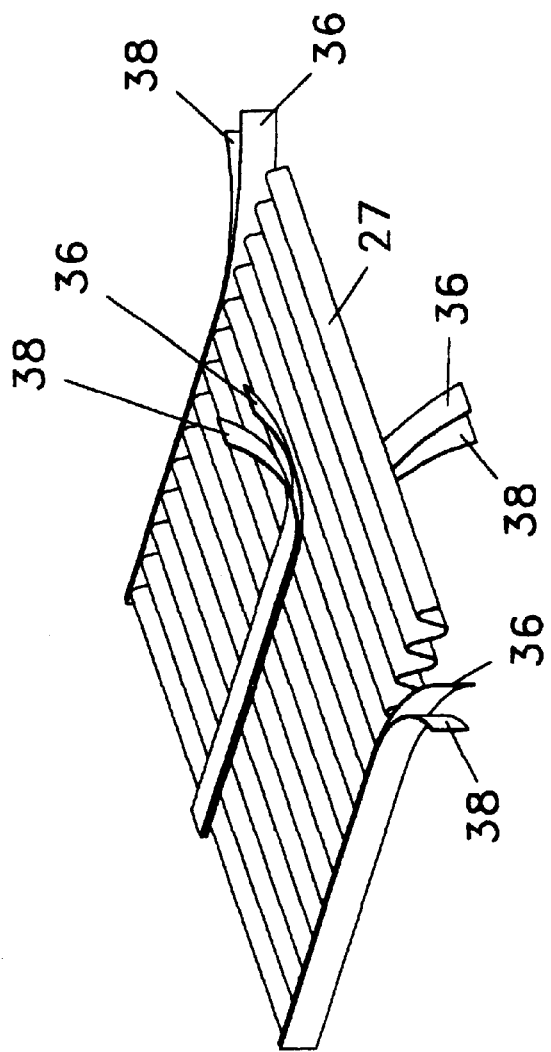
FIG. 5 is an isometric, partial, broken-away, exploded view of a further novel disposable unit filter also utilizing filter media formed in accordance with the plan arrangement of FIGS. 1 and 2 with another novel flow-through disposable frame arrangement.
Figure 6:
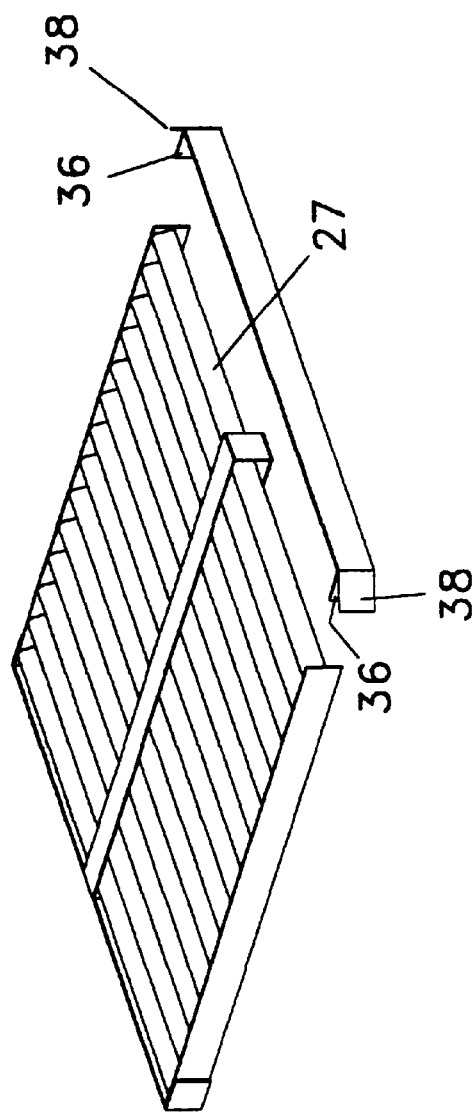
FIG. 6 is an isometric assembled view of the unit filter of FIG. 5.

Referring to FIGS. 5 and 6 of the drawings, still another novel frame assembly is disclosed for utilization with novel unit filter media 27, which has been formed, treated and severed in accordance with the aforedescribed novel arrangement described herein and disclosed in FIGS. 1 and 2 of the drawings. In this arrangement, flexible tape strips 36, including adhesive materials along opposite faces thereof, each have one adhesive face fastened to opposed peripheral edges of the pleats of filter unit 27 and to pleat crests intermediate the opposed edges. Stiffening strips 38 are then fastened to tape strips 36 to provide a stable framed unit filter.

Figure 7:
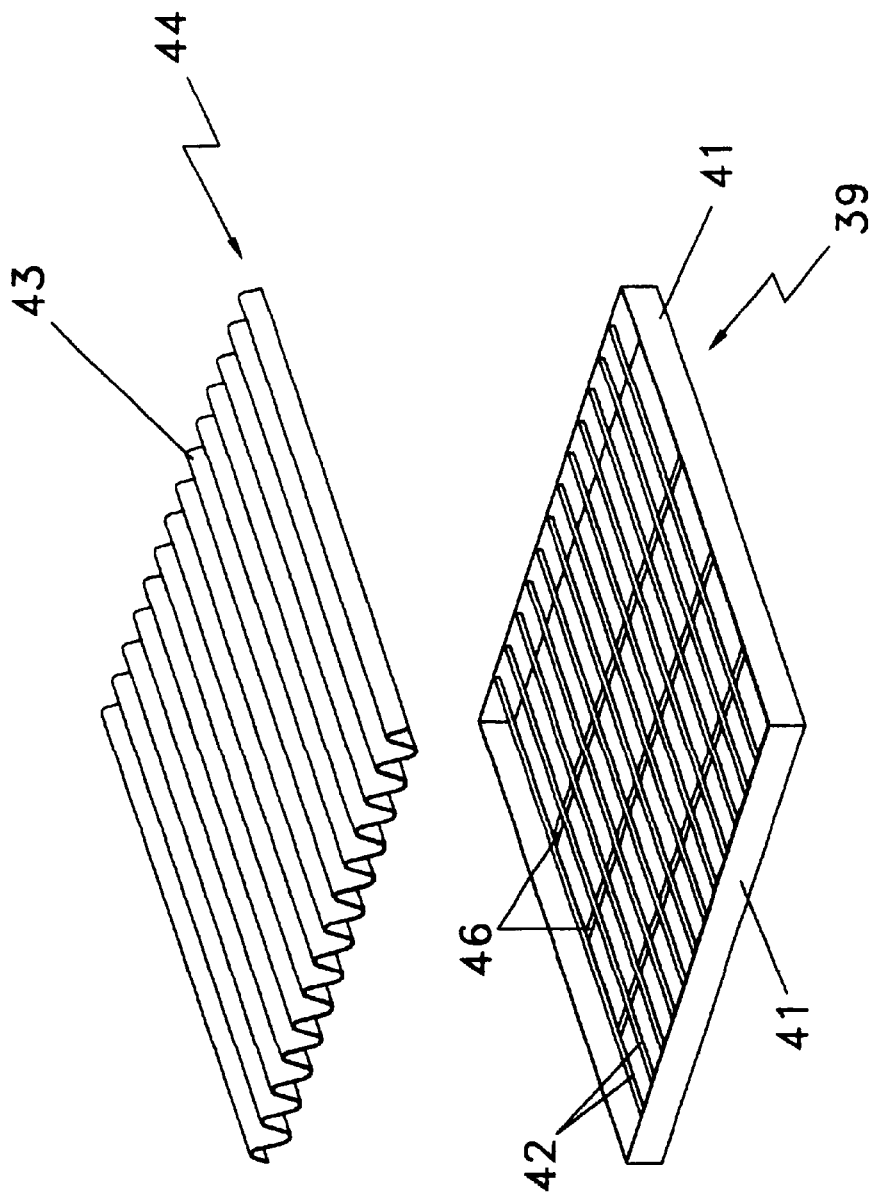
FIG. 7 is still another isometric assembled view of another unit filter.

Referring to exploded FIG. 7 of the drawings, a blank flow-through frame 39 with end fastened side panels 41 is disclosed. It is to be understood that frame 39 can be formed from either disposable or permanent materials. Frame 39 is provided with a plurality of spaced pleat support rod members 42 which extend in one plane thereacross and which are fastened at their opposite ends to the corresponding edges of one pair of opposed sides 41 of flow-through frame 39. These pleat support rods 42 serve to nest with the crests 43 of pleated filter medium unit 44—which can be formed in the novel arrangement as above described. A second set of spaced filter unit support rods 46 extend in a spaced plane from the plane of rods 42 and are fastened to the opposite corresponding edges of a pair of opposed sides 41 of flow-through frame 39. These spaced rods 46 serve to support the valleys of pleated unit filter medium 44 and to add to the general stability of flow-through frame 39.

Figure 8:
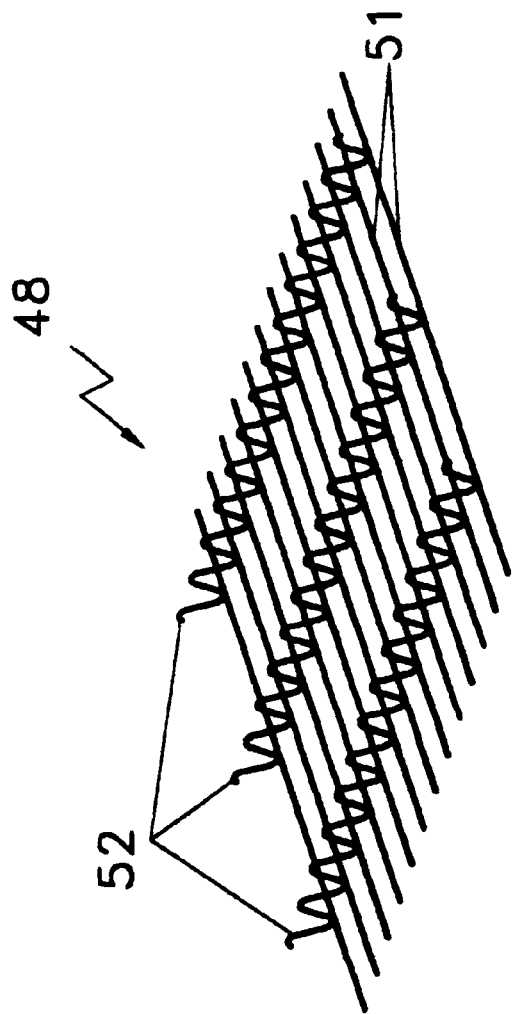
FIG. 8 is an isometric view of a permanent rod support arrangement for pleated media such as produced by the novel media arrangement of FIGS. 1 and 2; and, FIG. 9 is an isometric view of the permanent rod support arrangement of FIG. 8 assembled in a permanent frame to receive novel pleated filter media.
Figure 9:
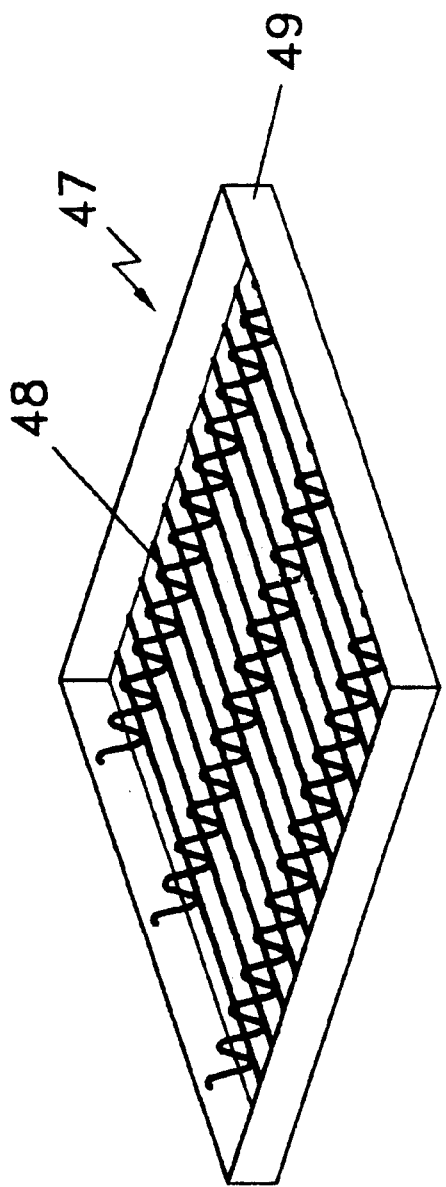

Referring to FIGS. 8 and 9 of the drawings, still another novel embodiment of a unit filter frame assembly 47 is disclosed. This flow-through frame assembly 47, like flow-through frame 44 above described, advantageously can be formed from permanent materials but the concept thereof can also be employed with disposable materials. As can be particularly seen in FIG. 8 of the drawings, a unified pleat support arrangement 48 is sized and configured to nestingly engage and be suitably fastened in flow-through fame 49. Unified pleat support arrangement (FIG. 8) includes a plurality of spaced support rods 51 extending in a common plane and having fastened thereto in a perpendicular fashion, the spaced transversely extending corrugated rod members 52. Corrugated rod members 52 serve to receive and support the crests of a pleated filter medium unit, such as the crests 43 of filter medium unit 44 of FIG. 7. The assembled unit, including straight support rod members 51, transverse corrugated rod members 52 and the supported pleated filter medium are then disposed in unit filter frame 49 for further fastening as necessary.

It is to be understood—as above noted—that any one of a number of types of fasteners can be employed in the disposable frame arrangements disclosed herein and that, if desired, permanent filter frames of heavier, more durable materials can be employed.

The invention claimed is:

1. Apparatus for forming fibrous filter media comprising:
 a fiber media forming means having a plurality of spaced die sets, each set including a plurality of spaced aligned apertures arranged to dispense fibrous strands therefrom in heated mat layer form;
 a mat forming collector means having a contoured surface positioned in relatively movable spaced relation below said fiber media forming means to successively receive each heated mat layer from each die set of said fiber media forming means to preselectively contour shape stacked mat layers into a conformed contour-shaped filter mat successively received from said fiber media forming means; and,
 a first transfer means cooperatively positioned with respect to said mat forming collector means to receive the conformed contour-shaped filter mat therefrom to transfer said conformed contour-shaped filter mat to a second transfer means for further contour shaping at preselected differing speeds and along differing contoured surfaces from said first transfer means to preselectively vary the shape of said conformed contour-shaped filter mat into a finalized contour-shaped filter mat.

2. The apparatus for forming fibrous filter media of claim 1, including binder material dispensing means and temperature treating means cooperative with said mat forming collector means to treat said successively layer mat when disposed on said mat forming collector means.

3. The apparatus for forming fibrous filter media of claim 1, said mat forming collector means being in the shape of a rotating drum having a pleat contour forming peripheral surface to successively receive and contour-shape said mat layers from said fiber media forming means.

4. The apparatus for forming fibrous filtering media of claim 1, said transfer means including endless belts of different contour shape compatibly sized and contoured with the contoured surface of said mat forming collector means and drivable at different speeds to finalize the contour-shape of said conformed contour-shaped filter mat received from said mat forming collector means.

5. The apparatus for forming fibrous filter media of claim 1, and a heat treating oven means positioned adjacent said transfer means to receive said finalized contour-shaped filter mat therefrom.

6. The apparatus for forming fibrous filtering media of claim 5, and filter unit severing and framing means successively following said heat treating oven means to successively sever said finalized contour-shaped filter mat into framed filter units.

7. The apparatus for forming fibrous filter media of claim 1, said contoured surface being interchangeable.

8. Apparatus for forming framed pleated mat filter units comprising: a heated melt blown fiber media forming die head having a plurality of spaced die sets, each set including a plurality of spaced aligned apertures arranged to dispense fibrous strands therefrom in heated mat layers with said spaced apertures of one mat layer forming die set being larger in cross-sectional area than the spaced apertures of a successive mat layer forming die set so that strands of successive fibrous mat layers are of successively diminishing cross-sectional area; an interchangeable rotating collector drum surface having a porous screen peripheral surface preselectively spaced below said spaced die sets to successively receive said fibrous mat layers from said die sets so that superposed mat layers have strands of diminishing cross-sectional area from top to bottom layer, said porous screen peripheral surface of said rotating drum defining a hollow porous screen rotating drum and being of preselected pleat contour-shape with said mat layers assuming said preselected pleat contour-shape of said porous screen; a binder dispenser positioned above said rotating drum to dispense a suitable binder between said mat layers as they initially reach said rotating porous screen drum surface; a fluid heater positioned in spaced relation below said rotating drum to direct a heat gas stream against said pleat-formed mat layers of fibrous filter media; a fluid cooler positioned within said hollow porous screen rotating drum to direct a cooling fluid medium against said pleat-formed fibrous mat layers of filter media as they exit said rotating drum unto a first movable endless transfer belt; said first movable endless transfer belt having a raised crested surface comparatively sized to nest in the valleys of said layered pleat contour-shaped fibrous mat layers of filter mat with the mat layer formed of diminished cross-sectional area being the bottom layer as it is fed from said rotating drum to said first transfer belt; a second movable endless transfer belt disposed in adjacent aligned relation with said first movable endless transfer belt having a raised crested surface compatibly sized to nest in the valleys of said layered pleat contour-shaped fibrous layers of filter mat, said crested surface of said second belt having crests of lesser breadth than the crests of said crested surface of said belt with said second movable transfer belt being arranged to move at a preselective lesser speed than the speed of said first movable belt so as to compress and elongate said pleated, layered filter mat as it is moved along said second endless belt, each first and second endless belts having an appropriately sized rotating crest spacer disposed there above to nest between and appropriately space the crests of said layered filter mat when moved along by said aligned first and second endless belts; a heat transfer pass-through oven cooperating with said second endless belt to temperature soak said layered pleated contour-shaped filter mat; and, filter unit severing and framing structure successively following said pass-through oven to successively sever said mat into filter units and frame said filter units.

\* \* \* \* \*